United States Patent
Ramallo et al.

(10) Patent No.: US 9,449,164 B2
(45) Date of Patent: Sep. 20, 2016

(54) METHOD OF SECURING A COMPUTING DEVICE

(71) Applicant: Rosberg System AS, Norevegen, Karmsund (NO)

(72) Inventors: Nestor Mario Ramallo, Vedavaagen (NO); Odd Helge Rosberg, Aksdal (NO); Alf Kenneth Braathen, Kopervik (NO)

(73) Assignee: Rosberg System AS, Karmsund (NO)

( * ) Notice: Subject to any disclaimer, the term of this patent is extended or adjusted under 35 U.S.C. 154(b) by 49 days.

(21) Appl. No.: 14/358,665

(22) PCT Filed: Nov. 15, 2012

(86) PCT No.: PCT/EP2012/072781
§ 371 (c)(1),
(2) Date: May 15, 2014

(87) PCT Pub. No.: WO2013/072433
PCT Pub. Date: May 23, 2013

(65) Prior Publication Data
US 2014/0331294 A1    Nov. 6, 2014

(30) Foreign Application Priority Data
Nov. 15, 2011   (GB) .................................. 1119683.9

(51) Int. Cl.
| | |
|---|---|
| *H04L 9/32* | (2006.01) |
| *H04L 9/00* | (2006.01) |
| *G06F 21/34* | (2013.01) |
| *G06F 21/62* | (2013.01) |
| *G06F 21/35* | (2013.01) |

(52) U.S. Cl.
CPC ............... *G06F 21/34* (2013.01); *G06F 21/35* (2013.01); *G06F 21/6245* (2013.01); *G06F 2221/2143* (2013.01)

(58) Field of Classification Search
CPC ........ G06F 21/34; G06F 21/50; G06F 21/60; G06F 21/62; G06F 21/77; G06F 21/78; G06F 21/6209; H04L 63/08; H04L 63/0853; H04L 63/10; H04W 12/04; H04W 12/08
USPC ............. 380/277; 713/189, 193; 726/2–7, 9, 726/26–30
See application file for complete search history.

(56) References Cited

U.S. PATENT DOCUMENTS

| | | | |
|---|---|---|---|
| 6,976,162 B1 | 12/2005 | Ellison et al. | |
| 7,111,172 B1 * | 9/2006 | Duane ................. | H04L 63/0272 380/277 |

(Continued)

FOREIGN PATENT DOCUMENTS

| | | |
|---|---|---|
| WO | WO-03/001350 A2 | 1/2003 |
| WO | WO 03/001350 A2 | 1/2003 |
| WO | WO 2011/027191 A1 | 3/2011 |

OTHER PUBLICATIONS

GB Examination Report for Application No. GB1119683.9, dated Jul. 22, 2015, 3 pages.

(Continued)

*Primary Examiner* — Hosuk Song
(74) *Attorney, Agent, or Firm* — Patterson Thuente Pedersen, P.A.

(57) ABSTRACT

A method of securing a computing device is disclosed. The computing device is configured to store an access key in a storage location in order for the computing device to operate in an operational mode. The method comprises removing the access key from the storage location in response to an event indicative of the end of the operational mode.

17 Claims, 1 Drawing Sheet

(56) References Cited

U.S. PATENT DOCUMENTS

| | | | |
|---|---|---|---|
| 7,392,404 B2* | 6/2008 | Montgomery | G06F 21/79 710/10 |
| 7,917,963 B2* | 3/2011 | Goyal | G06F 21/6209 726/29 |
| 8,321,916 B2* | 11/2012 | Aissi | G06F 21/6209 726/35 |
| 8,667,281 B1* | 3/2014 | Chenna | H04L 9/0825 713/168 |
| 2011/0010565 A1 | 1/2011 | Tomii et al. | |
| 2011/0274273 A1 | 11/2011 | Fiske | |

OTHER PUBLICATIONS

International Search Report and Written Opinion of the International Search Authority for PCT/EP2012/072781 dated Feb. 20, 2013.
Truecrypt, Free Open-Source On-The-Fly Encryption, User's Guide, Version 5.3
Office Action issued by Intellectual Property Office of United Kingdom dated Mar. 14, 2012 in related Foreign Application No. GB11196838.9.
CN Application No. 201280067019.7, Office Action dated Mar. 4, 2016, 10 pages.

* cited by examiner

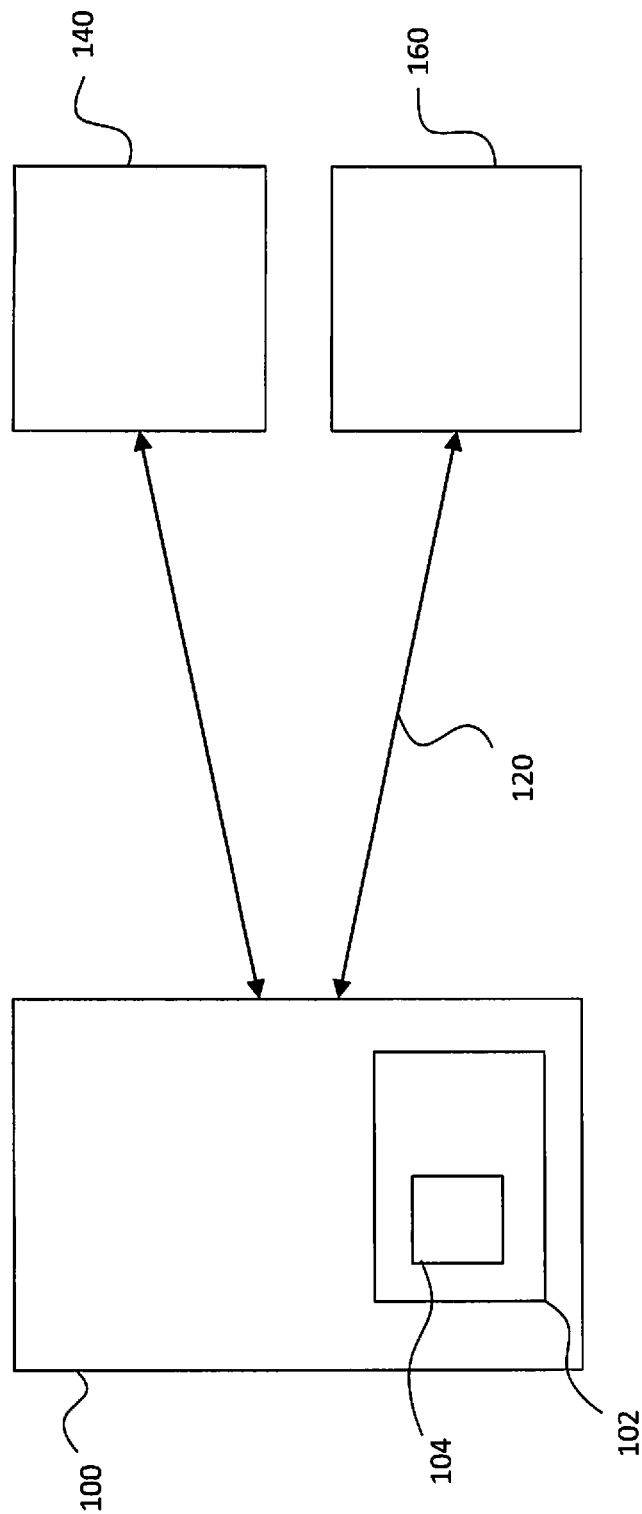

METHOD OF SECURING A COMPUTING DEVICE

This invention relates to a method of securing a computing device.

BACKGROUND

We live in an increasingly mobile society, and people experience increasingly that their computer devices or a unit containing computer devices, for example a car, are stolen, lost or disappear. More and more the motivation for such theft is the stealing of information rather than the device itself. Presently there are no good solutions that accommodate the need for locking down a computer device or parts thereof whenever it is not operational to such a degree that people trying to steal it or gain illegal access to it would find it impossible to do so. This implies that the device must be in a secured state whenever it is not operational, and will require a key from an external source to regain its ability to function.

The present invention, at least in its preferred embodiments, seeks to address this need.

BRIEF SUMMARY OF THE DISCLOSURE

In accordance with the present invention viewed from a first broad aspect there is provided a method of securing a computing device, wherein the computing device is configured to store an access key in a storage location in order for the computing device to operate in an operational mode, the method comprising removing the access key from the storage location in response to an event indicative of the end of the operational mode.

Viewed from a second aspect, the invention provides a method of securing a computing device, wherein the computing device is configured to store an access key in a storage location in order for the computing device to operate in an operational mode and the computing device is configured to prevent operation in the operational mode without the access key. The method comprises the computing device retrieving the access key from an external computing device in response to provision of identification data by a user and storing the access key in the storage location. The computing device then operates in said operational mode in response to receipt and storage of the access key and the computing device removes the access key from the storage location in response to an event indicative of the end of the operational mode.

Thus, in accordance with the invention, as soon as the computing device ceases to be in an operational mode, the access key is removed from the storage location, rendering the computing device secure because the access key is no longer available to allow the computing device to re-enter the operational mode.

The operational mode may be normal operation of the computing device or may be operation of a particular part of the computing device, such as an application or a virtual machine. The operational mode may be a mode in which access is granted to specific resources of the computing device or an external device, such as a hard drive, a partition of a hard drive, or other data storage.

The access key may be an encryption key or other access credentials as described herein. The provision of identification data by the user may be by means of data entry to the computing device, for example provision of a username and password or biometric data. The provision of identification data by the user may be by means of an external computing device, or example communication from a mobile phone.

The external computing device may be a remote server in data communication with the computing device, for example via a network. The external computing device may be a local computing device in local data communication with the computing device, for example via Bluetooth or Zigbee. The local computing device may be in data communication with the computing device via a network, including for example mobile or satellite networks. The local computing device may be a mobile phone or other similar personal computing device.

Removing the access key from the storage location may comprise deleting the access key from the storage location. Removing the access key from the storage location may comprise overwriting the access key with alternative data. Removing the access key from the storage location may comprise storing the access key in a different, secure storage location on the computing device. Removing the access key may comprise storing the access key on a further computing device in local data communication with the first computing device. The further computing device may be, for example, a mobile phone. Removing the access key may comprise storing the access key on a remote computing device in data communication with the first computing device. The remote computing device may be in data communication with the first computing device via a network. The computing device may be connected to at least a first remote computing device and a second remote computing device via a network and the method may comprise storing a first part of the access key on the first remote computing device and a second part of the access key on the second remote computing device. This has the advantage that no single remote computing device stores the full key. The computing device may be connected to a third remote computing device and the method may comprise storing one of the first part or the second part of the access key on the third remote computing device. This has the advantage of redundancy in storage of the key parts. This method may be extended to fourth, fifth, sixth remote computing devices and so on. The network may be a peer-to-peer network.

Any of the above methods of removing the access key may be used in isolation or combination.

The computing device may comprise volatile memory and the method may comprise storing the access key only in the volatile memory during the operational mode, whereby the access key is cleared from the volatile memory when the power supply to the computing device is interrupted. This has the advantage that the access key is removed in the event of unexpected power interruption. The method may comprise dumping the volatile memory, including the access key, to encrypted storage on hibernation of the device.

The step of removing the access key may be automatic in response to said event and effected without user intervention. In this way, an unauthorised user cannot prevent removal of the access key.

The event may comprise receipt of a command from a further computing device in data communication with the first computing device. The event may comprise a change of location of the computing device, for example an unauthorised change of location. The event may comprise closing an application running on the computing device. The event may comprise the termination of a connection to an external computing device. The external computing device may be, for example, a remote server or a local computing device such as a mobile phone or the like. The connection may be a wired connection, a wireless connection, a mobile data connection, a satellite connection, a Bluetooth connection or other similar connection.

The method may further comprise the step of retrieving the access key in response to entry of identification data by a user and storing the access key in the storage location. This step may be carried out to retrieve the access key for initial storage in the storage location or to return the access key (or a new access key) to the storage location.

In general terms the present invention relates to a method of enhancing computer safety by removing, deleting, moving (including copying and then deleting the source) and/or replacing/overwriting (with invalid data) keys, parts of keys or any other identifier used to gain access to computers, devices, storage or any other units. This is achieved by a predefined automated procedure that deletes, moves or removes a key given a set of circumstances such as closing an application, shutting down a computer device, connection, terminating a virtual machine or any other situation where such an action is desirable. This action may also be manual given the circumstances. The key is restored in a secure way by identifying the user and/or checking other required conditions and/or credentials (hardware or software) before initiating the restore procedure.

Thus, the key is deleted in a safe way triggered by an event as described above. The event may be an external event, such as an external command from e.g. a server, a different user device (like a mobile phone), or another device assigned to give such commands. The event may be a change in conditions, such as location, docked/undocked, change of network, domain, proximity to other devices or any other condition. The event may be termination of either a connection, an application, a virtual machine, a subset of an application or any other event that should trigger this action.

Deleting a key may protect an entire device, part of a device or any module or unit within or surrounding the device including software and hardware.

The encryption key may be stored in volatile memory, thus ensuring that the key is deleted (disappears) when the device is turned off. With the encryption key in volatile memory, the key may be dumped to an encrypted storage device on hibernation of the device or other states where this action is triggered. In this case, if the key is in the storage device, a new key will be supplied to restore access to the named storage device.

Deletion of the key may require a copy of the key to exist on another device or server or similar, or on several devices, either as a full key, encrypted or as fragments of keys.

The key may be moved or removed in a safe way triggered by an event as described above to an alternative location internally in the device or externally e.g. to a key server, to an alternative device, to a cloud service or any other method of distributing keys to other locations.

The method may involve replacing the key rather than deleting it to provide invalid data in order to make it harder to read the original key and harder to see if the key is a valid one or an invalid one. The key may be overwritten a number of times to provide sufficient security.

Where the device to be secured is participating in a network, the key may be fragmented and stored in several locations. This spreads the key over a number of devices providing security as no one of the devices holds the entire key or knows of it. Redundancy may be created in order to provide a full key even if some devices are not available at the point of retrieval.

The method may involve restoring, distributing or supplying keys to the named physical or virtual device, software, operating system or any other applicable device, unit or software using any known method to do so including any known security measure included in such methods making the physical or virtual device, application, functionality or unit available. This may also be done from an alternative device, like a mobile phone, by calling, SMS, e-mail, or from any other device.

The method may use the communication technique described in WO 2010/039041 to restore keys in a secure way. In this case, the client device first sends a request to the server using any method of communication identifying that the client requests a replacement key. This may also be done from an alternative device, such as a mobile phone, by calling, SMS, e-mail, or from any other device. This will in turn trigger an event in the server using the techniques of WO 2010/039041 to send a request to the device that is rejected, and the device will search for the identifier, and if found connect back using any mean of communications to the server.

The method may be applied to computers, devices, storage or any other units in a peer to peer, meshed network, file sharing network, torrent like network or any similar network by copying the key(s), user credentials, certificate(s), passphrase(s), and other information to an alternative location(s) before deletion using the meshed network(s) and similar types of network. The method may use encrypted or unencrypted mesh areas (or similar) for storing torrent files containing key blocks. The device may be a part of one or several meshed networks where the key may be moved to another device in the mesh. This may be a private mesh, a corporate mesh or any other kind of mesh. The key may also be distributed over a number of meshed devices so that no device on its own keeps the entire key, providing a simple and very safe method of making it impossible to find the key without having access to several devices. One meshed device also may hold e.g. a hash key that needs to be combined with a key on another device to generate the required encryption key. These meshed devices may then also serve as a resource to each other to store keys or part of keys on all these devices. Redundancy may also be created, meaning that the same key or part of key may be stored on multiple meshed devices.

The invention extends to a computing device configured to operate in accordance with the method of the invention. The invention also extends to computer software which configures a computing device to operate in accordance with the method.

BRIEF DESCRIPTION OF THE DRAWINGS

Embodiments of the invention are further described hereinafter with reference to the accompanying drawings, in which:

FIG. 1 is a diagram showing a system in accordance with an embodiment of the present invention.

DETAILED DESCRIPTION

In broad terms, the present invention relates to a system for removal and restoration of keys from a computer device. The computer device may be any device comprising a data processor of any kind. Such a device may be, for example, a computer, an m2m (machine to machine) device, any mobile unit such as a phone, a pad (tablet computer), a smartphone, a car, any kind of vehicle, weapons, guns, personal devices of any kind, utilities, security systems, in short anything with data processing capability.

The stored access key may comprise user credentials (username, password and the like), license keys, encryption keys (to encrypt/decrypt data on hardware/storage devices, data sent through a virtual private network (VPN) over e.g. mobile networks, data sent through secure socket layer (SSL) secured connections and the like), digital certificates, digital signatures, biometric keys, encrypted packages (e.g. time/biometric or similar hashed encryption keys) or other security mechanisms or security information of any kind.

This invention concerns a procedure to enhance the safety of computer devices or a unit containing computer devices (e.g. a car) by deleting, moving, removing and/or replacing keys and initializing a restore process upon request which renders the said computer device in a secured state unless proper authorisation procedures are completed successfully. To enhance the security even further the key can be spread in pieces or fragments to several hosts (e.g. a meshed network), making sure the key is never stored in its entirety in a single location.

The method has the advantage that a remotely stored key can be removed permanently if the computing device is stolen, compared to locally stored keys which stay with the stolen device. In addition, fraudulent authentication attempts may be identified and/or prevented more effectively through a centralised or remote system. In combination with our earlier secure communication technique described in WO 2010/039041, safe transfer of the key can be effected.

The method of the invention allows configurable rules for the removal of keys according to a desired application or security level, which allows flexible control, for example high security versus convenience. The method also allows distributed remote partial keys for enhanced security and allows redundant remote keys to reduce occasions were a valid user is locked out.

The method can be used to protect an entire computing device or parts of an operational system, such as a virtual machine or partition.

According to the method of the invention keys or part of keys (e.g. the hard disk encryption key) are removed whenever the device is put into a state other than an in-use state, for example sleep, hibernation or turned off. The removal may be deletion, by moving the key to an external server, to a different location within the device, to another device, or any other method of removal, deletion, and transfer to a different location or for that matter encryption of the key or part(s) of the key. There may be several means of removing the key, either by keeping the key in volatile memory, or letting the device delete the key upon putting the device in any other state than the active state. This procedure may also be used to remove keys while the computing device is in use to allow or prevent access to parts of the device and/or parts of the device's storage, such as a partition or an encrypted file, as well as access to any software, remote service or resource on LAN, WAN, on the Internet, in a meshed environment or any other resource. A mesh may be any private peer to peer network over a public or private network.

The key (or parts of the key) is recovered by reading from one or several different locations being internal and/or external sources when the device is initially started or taken out of any non-active state. The key is then stored in a volatile memory area or a nonvolatile memory area or storage location, with predefined criteria for actions to move, remove, delete, or replace the key, or when accessing any service, file area, resource etc. that requires encryption. The method will also provide new keys on given conditions.

The deletion process involves removing data from the computing device, from volatile or non-volatile memory, from storage devices such as hard disks, solid state drive (SSD) disks, memory sticks, from processors, trusted platform module (TPM) chips or other forms of similar storage, i.e. any device capable of storing information. The deletion may be simple (just removing information) or complex (such as overwriting the memory cells a number of times to make sure the information is non-restorable). Deletion may occur by removal of power from volatile memory.

An exemplified embodiment of the method of the invention may be securing a laptop containing sensitive data. When the laptop is off, in sleep or hibernation mode (active removal of encryption key when hibernating or using e.g. win+L in Microsoft windows) there is no encryption key inside the device. When the laptop is to be used, it requests a login from the user (username/password, biometric logon etc.) and then request the encryption key through a communication method such as VPN over 3G from a centralized server which validates the user. Based on the user validation, the server generates an encrypted package containing the encryption key that can be hashed with a time stamp or similar and sent to the laptop which in turn will decrypt the package and store the encryption key in volatile memory. The laptop uses the encryption key to provide access to the master boot record (MBR) and thereby allows the laptop to initiate its boot procedure or allows access to the storage device when logging in. When the computer is turned off the key will disappear, because the key is stored in volatile memory. If the laptop hibernates the key will be written to the storage device, but since this is encrypted the key will not be accessible and a new encryption key will be requested in the next initiation of the device in order to initiate the boot procedure. Alternatively, when the computer is put into sleep mode, hibernation or turned off, the encryption key is deleted from the system and a new key will be requested from the server when the device is to be used.

Another example of use is while the computer device is active, and the user needs access to a specific file, area on the disk, or cloud service, the same method of removal and restoral of encryption keys may be used, either using functionality from the hardware layer or from the operating system layer. One example of this may be a virtual machine stored on the computer device that gives access to a corporate network with high security needs. The key is stored in volatile memory, and is actively removed whenever the virtual machine is closed, or put in any other state than the active state. The main operating system may be unprotected by this method, or may also be protected in the same way providing a multiple layer of security, if desired.

The encryption key may be sent or retrieved from other sources than a server, for example as described in the following.

The encryption key or parts of the encryption key may be stored on another user device, such as a smartphone, a pad (tablet computer), a plug computer, or any other personal device. In this way the user does not need to rely on access to the central server to start the device, but can retrieve the key via, for example a Bluetooth connection to the user's pad, or near field communication to the mobile device. This increases the level of security if the device is stolen, as the other device needs to be in proximity to the computing device requiring the encryption key. These devices may then also serve as a resource to each other to store keys or part of keys on all these devices. One may also create redundancy, meaning that the same key or part of key may be stored on multiple devices.

The computing device may be a part of one or several mesh and/or private networks (e.g. IPv6 based networks) where the key may be on another device in the network. This may be a private network (internal or over the internet), a personal network, a corporate network/mesh or any other kind of network. The key may also be distributed over a number of devices so that no device on its own keeps the entire key, providing a simple and very safe method of making it impossible to find the key without having access to several devices. One device may also hold, for example, a hash key that needs to be combined with a key on another device to generate the needed encryption key. These devices may then also serve as a resource to each other to store keys or part of keys on all these devices. One may also create redundancy, meaning that the same key or part of key may be stored on multiple devices.

In the machine to machine (M2M) world there are many uses for this technology, especially in fields where enhanced security is needed for example as described in the following.

The method of the invention may be used to increase security in a mobile payment solution and to protect the application on devices in such a way that a virus or other malicious software is unable to obtain access to the user's financial information and/or accounts. For example, where two devices want to make a transaction, e.g. two mobile phones, or a mobile phone and an automated teller machine (ATM). Each phone (or device) has an application that connects it to the financial institution securely, but part of the application is encrypted and secured until another device is identified with which to carry out the transaction. This application may also be a virtual machine or similar running isolated from the device. The device may be an ATM, a point of sale (POS) terminal, a handheld credit card terminal, a mobile device, a computer of any kind or any other suitable device. This may be done by using NFC, a personal area network (PAN), and LAN, WAN, mobile networks or any other mean of communication with any secured way of connecting to other devices. When the transaction party is located, a request is sent to the financial institution to provide encryption keys for the two devices unlocking the application needed to perform the transaction, but only to the two approved devices. Additional certificates may also be provided. The transaction is then started by matching keys and/or certificates and/or other identifiers between devices. The applications within these devices and/or the financial institution approve these, and complete the transaction after which the device is commanded to remove the certificates/keys/identifiers, and feedback is given to the financial institution that this has been done. This ensures that the application on the device can only perform transactions with approved devices, and after completion the application is locked. In the case of a connection to an ATM only the mobile device is locked after completion. In the case of a mobile to mobile payment both applications are locked after completion. This method may of course be combined with different means of authentication if needed, such as passwords, PIN-codes, one-time text message passwords (two factor authentication), fingerprint or other biometric information, or any other method of authentication or identification of the user.

In cars or vehicles there are many alternative ways of using the method of the invention. For example, we describe a method of encrypting the management part of the vehicle so that the encryption key is removed whenever the management part is not used. The encryption key is restored after communication with the device is made, and without the key there is no way into the management part of the vehicle. Different encryption keys may be used to gain access at different levels, e.g. one for updating software and doing maintenance, one for reading statistics, and one for track and delete purposes. There are almost limitless applications for this method.

One may also apply the method of the invention as a secure way of moving encryption keys to other devices, such as mobile phones, to gain access to drive and use the vehicle, and also adding functionality so that a user may have to request permission to access a given vehicle, for instance for military use or when hiring a car. Instead of moving the key, one may delete the key, meaning that the device will have a pre-installed key that will be moved to the car/vehicle upon use. The other device (e.g. a mobile phone) may also have to request the key or part of it from a central server or similar in order to create a hashed key to send to the vehicle.

This method may also be used to give time-limited encryption keys that will expire after a given time automatically, exemplified by lending a car to someone or for a company renting cars.

The method used is in principle the same as with mobile payment, only that the rights to distribute permissions and rights may belong to someone else, or several others (like a garage for maintenance, insurance for mileage reports, the owner for giving permission to use the car).

A further example of the use of the method of the invention is securing devices. This method can be applied to for instance to laptops in such a way that if a laptop is stolen, the owner may trigger the laptop to remove the encryption keys and in that way render the device useless, protecting the data on the device. This may be done by calling a service centre that sends a command to the device to remove the key, by using an app on the person's smartphone, an application on another computer or proximity services between a mobile device and the computer or any other or similar ways of triggering such an action.

Using the same method, one may also trigger functionality in the device to start transmitting location information or gather information by sending information from the device's microphone, camera, biometric devices or similar.

In this way, a complete and very secure way of protecting a device, parts of it or tracking and locating it may be done.

The method of the invention may also be applied in machine to machine application, for example for devices behind customer's firewalls. An example of usage here is a computer tomography (CT) scanner in a hospital. The management part of the scanner is an encrypted virtual machine, but connected to 3G with a modem. The trusted service centre can connect to the device and put in the encryption key and the virtual machine is then turned on. Alternatively the service centre needs the customer's personnel to put the corresponding encryption key in place before they can connect to the device for security reasons. The encryption key is removed automatically and the virtual machine is stopped when the session is closed.

The method of the invention can be used in combination with our earlier secure communication technique described in WO 2010/039041, the disclosure of which is incorporated herein by reference. This communication technique can be used as a building block for the present invention to provide additional security to devices. The communication technique may be carried out by first sending a request to a device which is rejected. The device then checks the identifier and if recognized calls to a designated IP-address associated with the identifier. After establishing a secured connection the encryption key to the device is transferred and the device is unlocked and can be used.

FIG. 1 shows a diagram of a system according to an embodiment of the present invention.

In summary, a method of securing a computing device 100 is disclosed. The computing device 100 is configured to store an access key 104 in a storage location 102 in order for the computing device 100 to operate in an operational mode. The computing device 100 is configured to prevent operation in the operational mode without the access key 104. The method comprises the computing device 100 retrieving the access key 104 from an external computing device 140 in response to provision of identification data by a user and storing the access key 104 in the storage location 102. The method further comprises the computing device 100 operating in said operational mode in response to receipt and storage of the access key 104. The method still further comprises the computing device 100 removing the access key 104 from the storage location 102 in response to an event indicative of the end of the operational mode. Removing the access key 104 from the storage location 102 comprises deleting the access key 104 and storing the access key 104 on a further computing device 160 in data communication 120 with the first computing device.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers and characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of securing a computing device, wherein the computing device is configured to store an access key in a storage location in order for the computing device to operate in an operational mode and the computing device is configured to prevent operation in the operational mode without the access key, the method comprising:

the computing device retrieving the access key from an external computing device in response to provision of identification data by a user and storing the access key in the storage location;

the computing device operating in said operational mode in response to receipt and storage of the access key;

the computing device removing the access key from the storage location in response to an event indicative of the end of the operational mode, wherein removing the access key from the storage location comprises deleting the access key from the storage location and storing the access key on a further computing device in data communication with the first computing device.

2. A method as claimed in claim 1, wherein the external computing device is a remote server in data communication with the computing device.

3. A method as claimed in claim 1, wherein the external computing device is a local computing device in local data communication with the computing device.

4. A method as claimed in claim 3, wherein the local computing device is a mobile phone.

5. A method as claimed in claim 1, wherein removing the access key from the storage location comprises overwriting the access key with alternative data.

6. A method as claimed in claim 1, wherein the further computing device is in local data communication with the first computing device.

7. A method as claimed in claim 1, wherein the further computing device is a remote computing device in data communication with the first computing device.

8. A method as claimed in claim 7, wherein the computing device is connected to at least a first remote computing device and a second remote computing device via a network and the method comprises storing a first part of the access key on the first remote computing device and a second part of the access key on the second remote computing device.

9. A method as claimed in claim 8, wherein the computing device is connected to a third remote computing device and the method comprises storing one of the first part or the second part of the access key on the third remote computing device.

10. A method as claimed in claim 1, wherein the network is a peer-to-peer network.

11. A method as claimed in claim 1, wherein the computing device comprises volatile memory and the method comprises storing the access key only in the volatile memory during the operational mode, whereby the access key is cleared from the volatile memory when the power supply to the computing device is interrupted.

12. A method as claimed in claim 1, wherein the step of removing the access key is automatic in response to said event and is effected without user intervention.

13. A method as claimed in claim 1, wherein the event comprises receipt of a command from a further computing device in data communication with the first computing device.

14. A method as claimed in 1, wherein the event comprises a change of location of the computing device.

15. A method as claimed in claim 1, wherein the event comprises closing an application running on the computing device.

16. A computing device configured to operate in accordance with the method of claim 1.

17. Computer software which configures a computing device to operate in accordance with the method of claim 1.

* * * * *